(12) United States Patent
Maruyama

(10) Patent No.: US 7,528,362 B2
(45) Date of Patent: May 5, 2009

(54) PULSE MODULATING PHOTODETECTOR AND ELECTRONIC DEVICE

(75) Inventor: Yasuhiro Maruyama, Katsuragi (JP)

(73) Assignee: Sharp Kabushiki Kaisha, Osaka (JP)

( * ) Notice: Subject to any disclaimer, the term of this patent is extended or adjusted under 35 U.S.C. 154(b) by 239 days.

(21) Appl. No.: 11/589,975

(22) Filed: Oct. 31, 2006

(65) Prior Publication Data
US 2007/0098409 A1    May 3, 2007

(30) Foreign Application Priority Data
Nov. 1, 2005    (JP) .............................. 2005-318874

(51) Int. Cl.
*G01J 1/34* (2006.01)
(52) U.S. Cl. ............................... 250/227.21; 250/559.4
(58) Field of Classification Search ............ 250/227.21, 250/559.4
See application file for complete search history.

(56) References Cited

U.S. PATENT DOCUMENTS 6,720,545 B2 * 4/2004 Mizuhara et al. ............ 250/221

FOREIGN PATENT DOCUMENTS

JP    6-209250 A    7/1994

* cited by examiner

*Primary Examiner*—Seung C Sohn
(74) *Attorney, Agent, or Firm*—Birch, Stewart, Kolasch & Birch, LLP

(57) ABSTRACT

The invention provides a pulse modulation photodetector, which detects, by projecting pulsed light, presence or absence of a physical object based on whether the pulsed light is received or not according to passage of the physical object. The pulsed light has a pulse width modulated according to a light emission pulse, which is generated based on a clock pulse signal and has a modulation cycle. The modulation cycle includes a light emission period during which the light emission pulse is present, and a non light emission period other than the light emission period. Further, the clock pulse signal has a pulse width being shorter in the light emission period than in the non light emission period.

7 Claims, 12 Drawing Sheets

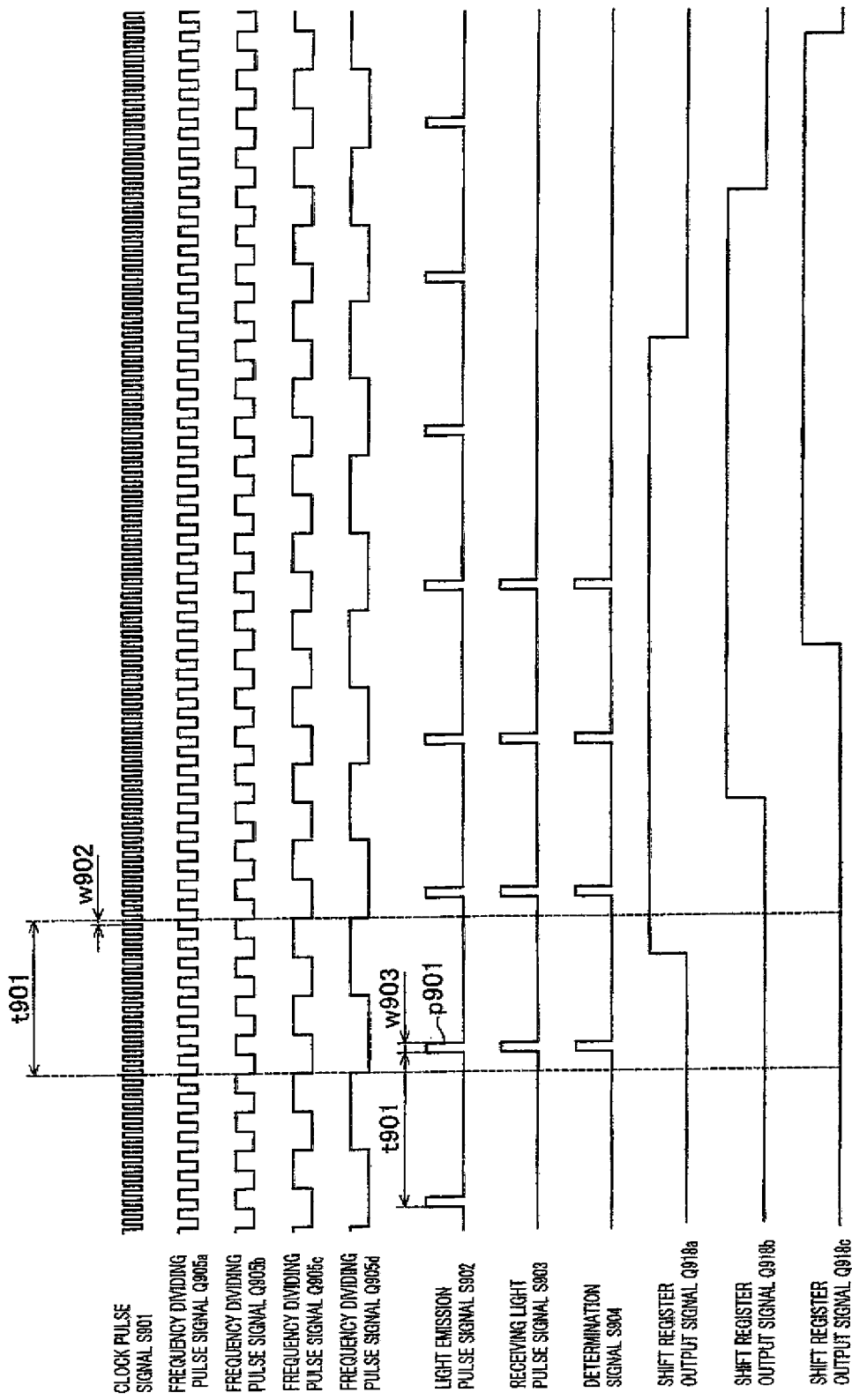

US 7,528,362 B2

PULSE MODULATING PHOTODETECTOR AND ELECTRONIC DEVICE

This Nonprovisional application claims priority under 35 U.S.C. § 119(a) on Patent Application No. 318874/2005 filed in Japan on Nov. 1, 2005, the entire contents of which are hereby incorporated by reference.

FIELD OF THE INVENTION

The present invention relates to a pulse modulation photodetector and an electronic device which detect presence or absence of an object by projecting light which is emitted by a light emitting element and which has a modulated pulse width.

BACKGROUND OF THE INVENTION

Conventionally, reflective pulse modulation photodetectors have been widely used which detect presence or absence of a physical object. In such reflective pulse modulation photodetectors, pulsed light is projected which has a pulse width modulated according to a light emission pulse generated based on a clock pulse signal and having a modulation cycle. Then, presence or absence of a physical object is detected according to whether or not the pulsed light reflected by the physical object passing in front of a light emitting element and a light receiving element is received. Further, transmissive pulse modulation photodetectors have also been widely used which detect presence or absence of a physical object according to whether pulsed light from the light emitting element is received by a light receiving element or blocked by the physical object passing between a light emitting element and the light receiving element.

FIG. 10 is a block diagram illustrating a structure of a conventional photodetector 900. FIG. 11 is a block diagram illustrating a specific structure of the photodetector 900 including a light emission pulse generating circuit 903 and a signal processing circuit 914. FIG. 12 is a timing chart representing operations of the photodetector 900.

The photodetector 900 includes an oscillator circuit 902. The oscillator circuit 902 generates a clock pulse signal S901, and provides it to the light emission pulse generating circuit 903. The light emission pulse generating circuit 903 modulates the clock pulse signal S901 thus received from the oscillator circuit 902, so as to generate and provide a light emission pulse signal S902 to a light emitting element drive circuit 907. The light emission pulse signal S902 includes and a light emission pulse p901 having a modulation cycle t901 and a pulse width w903. The light emitting element drive circuit 907 drives a light emitting element 908 based on the light emission pulse signal S902 received from the light emission pulse generating circuit 903, causing the light emitting element 908 to project pulsed light 909 having a modulated pulse width.

The pulsed light 909 having a modulated pulse width is reflected by a physical object 910 passing in front of the light emitting element 908 and a light receiving element 911, and is incident on the light receiving element 911. Thus, if there is no ambient light in the vicinity, the pulsed light 909 directed to the light receiving element 911 is turned ON or OFF depending on whether or not the object A passes.

The light receiving element 911 photoelectrically converts the pulsed light 909 reflected by the physical object 910, so as to generate and provide a receiving light pulse signal S903 to an amplifier 912. The amplifier 912 amplifies the receiving light pulse signal S903 received from the light receiving element 911, and provides it to a determination circuit 913. The determination circuit 913 corrugates the receiving light pulse signal S903 thus amplified by the amplifier 912, so as to generate and provide a determination signal S904 to the signal processing circuit 914. The signal processing circuit 914 outputs a high or low level signal to an output circuit 919, based on the determination signal S904 received from the determination circuit 913.

The light emission pulse generating circuit 903 includes a 4-stage binary counter 904. The 4-stage binary counter 904 includes flip flops 905a, 905b, 905c, and 905d, which are connected in series. The light emission pulse generating circuit 903 further includes a timing circuit 906 which generates the light emission pulse signal S902 based on signals outputted from the 4-stage binary counter 904.

The signal processing circuit 914 includes a latch circuit 915, a state detection circuit 916, and a 3-stage shift register 917. The latch circuit 915 latches the determination signal S904 received from the determination circuit 913. Based on the light emission pulse signal S902 generated by the timing circuit 906, the state detection circuit 916 detects a state of a signal outputted from the latch circuit 915. Further, the 3-stage shift register 917 outputs a high or low level signal to the output circuit 919, based on the result of detection made by the state detection circuit 916. The 3-stage shift register 917 includes flip flops 918a, 918b, and 918c, which are connected in series.

The timing circuit 906 generates the light emission pulse signal S902 having one light emission timing $(1/2^4)$ duty (1/16 duty: pulse width w903) in one cycle. As used herein, one cycle (i.e., modulation cycle t901) is constituted by $2^4$. (i.e., 16) basic clocks. The light emission pulse signal S902 is produced from the combination of frequency dividing pulse signals Q905a, Q905a_, Q905b, Q905b_, Q905c, Q905c_, Q905d, and Q905d_, whose frequencies are divided by the flip flops 905a, 905b, 905c, and 905d of the 4-stage binary counter 904.

The timing circuit 906 provides the light emission pulse signal S902 to the light emitting element drive circuit 907. Further, the timing circuit 906 provides the light emission pulse signal S902 to the signal processing circuit 914 by using (i) as a synchronous timing, a time period which corresponds to the pulse width w903 and which indicates the light emission timing and (ii) as asynchronous timing, time periods other than the period corresponding to the light emission timing.

In a case where neither ambient light nor the pulsed light from the light emitting element 908 is incident on the light receiving element 911, the determination signal S904, provided from the determination circuit 913 to the signal processing circuit 914, indicates that no pulse signal is present in the synchronous timing of the determination signal S904. Thus, the state detection circuit 916 determines that there is no signal and no noise, and the flip flops 918a, 918b, and 918c of the 3-stage shift register 917 output shift register output signals Q918a, Q918b, and Q918c in a low level. As such, as long as no pulse signal is present in the synchronous timing of the determination signal S904 and there is no ambient light, the signal processing circuit 914 outputs a low level signal.

In a case where there is no ambient light and where the pulsed light emitted from the light emitting element 908 and reflected by the physical object 910 is incident on the light receiving element 911, the determination signal S904, provided from the determination circuit 913 to the signal processing circuit 914, indicates that a pulse signal is present in the synchronous timing of the determination signal S904. Therefore, the determination signal S904 is latched by the latch circuit 915, and the state detection circuit 916 determines that there is a signal and no noise. Accordingly, the shift register output signals Q918a, Q918b, and Q918c of the shift register 917 are inverted from low to high, while being transmitted through the three stages. As a result, the output circuit 919 receives the signal in a high level. As such, in the case where there is no ambient light and where a pulse signal is present in the synchronous timing of the determination signal S904, the signal processing circuit 914 outputs a high level signal.

Regardless of a demand for a reduction in consumption current of optical modulation detectors, the ratio of a current flowing through a light emitting element such as an LED to an overall consumption current of the optical modulation detector is large. On the other hand the S/N ratio of the light emitting elements should not be reduced in order that circuit malfunction does not easily occur even when light including noise components is incident on the light emitting element. Since a current of not less than a predetermined value needs to be flown through the light emitting element, it is difficult to reduce a consumption current of the light emitting element.

Further, in a case where a plurality of light emission timings are set in 1 modulation cycle to prevent (i) error detection of ambient light and (ii) unauthorized use of signal(s), a current flowing through a light emitting element such as an LED increases. This causes more difficulties in reducing a consumption current of the light emitting element.

Japanese Unexamined Patent Publication 209250/1994. (Tokukaihei 6-209250, publication date: Jul. 26, 1994) (Patent Document 1) discloses an arrangement in which a detection activating circuit detects whether or not a photoelectric switch senses an object etc. In the arrangement disclosed in the publication, if an object etc. may not be sensed, an oscillation cycle of an oscillator circuit is set to a long cycle T1, while the oscillation cycle is set to a short cycle T2 if an object etc. may be sensed.

In the arrangement disclosed in the publication, however, a consumption current is still large in a time period during which an object etc. may not be sensed. Thus, the consumption current cannot be reduced sufficiently.

SUMMARY OF THE INVENTION

The present invention is made in view of the foregoing problems, and an object of the invention is to provide a pulse modulation photodetector and an electronic device which have a reduced consumption current.

To attain the foregoing object, a pulse modulation photodetector of the present invention detects presence or absence of a physical object, by projecting pulsed light, based on whether the pulsed light is received or not according to passage of the physical object, the pulsed light having a pulse width modulated according to a light emission pulse which is generated based on a clock pulse signal and which has a modulation cycle, the modulation cycle, including: a light emission period during which the light emission pulse is present; and a non light emission period other than the light emission period, the clock pulse signal having a pulse width being shorter in the light emission period than in the non light emission period.

With the above feature, the pulse width of the clock pulse signal is made shorter in the light emission period than in the non light emission period. This reduces the pulse width of the light emission pulse, generated based on the clock pulse signal having a reduced pulse width. Accordingly, a time period is reduced during which a current flows through a light emitting element projecting pulsed light, which has a pulse modulated according to the light emission pulse. As such, a consumption current of the light emitting element is reduced, while at the same time the S/N ratio of the pulsed light is not degraded by reducing a current flowing through the light emitting element. Thus, a pulse modulation photodetector is realized which has a reduced consumption current.

To attain the foregoing object, an electronic device of the present invention includes a pulse modulation photodetector of the present invention.

With the above feature, the pulse width of the clock pulse signal is made shorter in the light emission period than in the non light emission period. This reduces the pulse width of the light emission pulse, generated based on the clock pulse signal having a reduced pulse width. Accordingly, a time period is reduced during which a current flows through a light emitting element projecting pulsed light, which has a pulse width modulated according to the light emission pulse. As such, a consumption current of the light emitting element is reduced, while at the same time the S/N ratio of the pulsed light is not degraded by reducing a current flowing through the light emitting element. Thus, an electronic device is realized which has a reduced consumption current.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 12 is a timing chart representing operations of the photodetector.

DESCRIPTION OF THE EMBODIMENTS

First Embodiment

Figure 1:
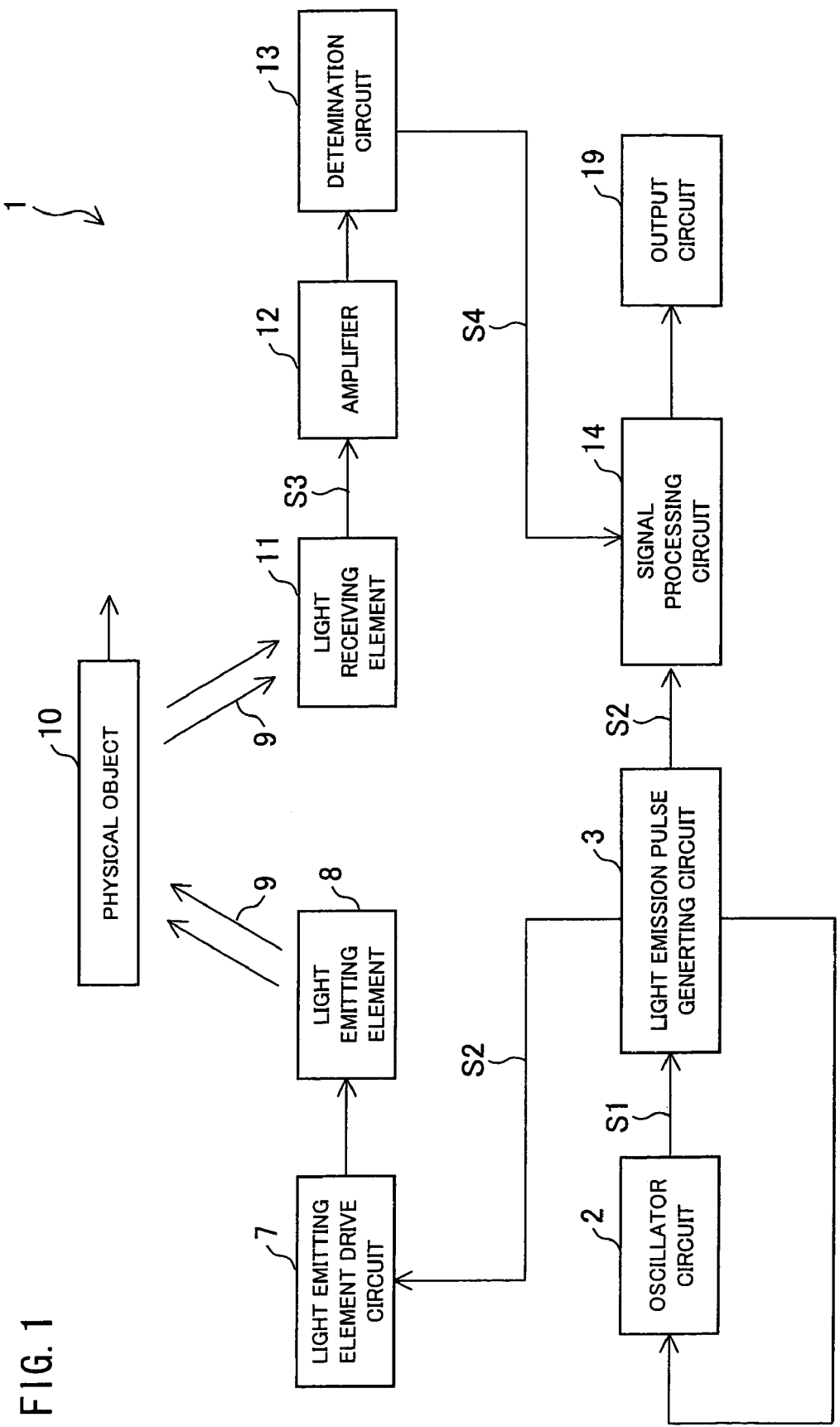
FIG. 1 is a block diagram illustrating a structure of a photodetector according to a first embodiment.
Figure 2:
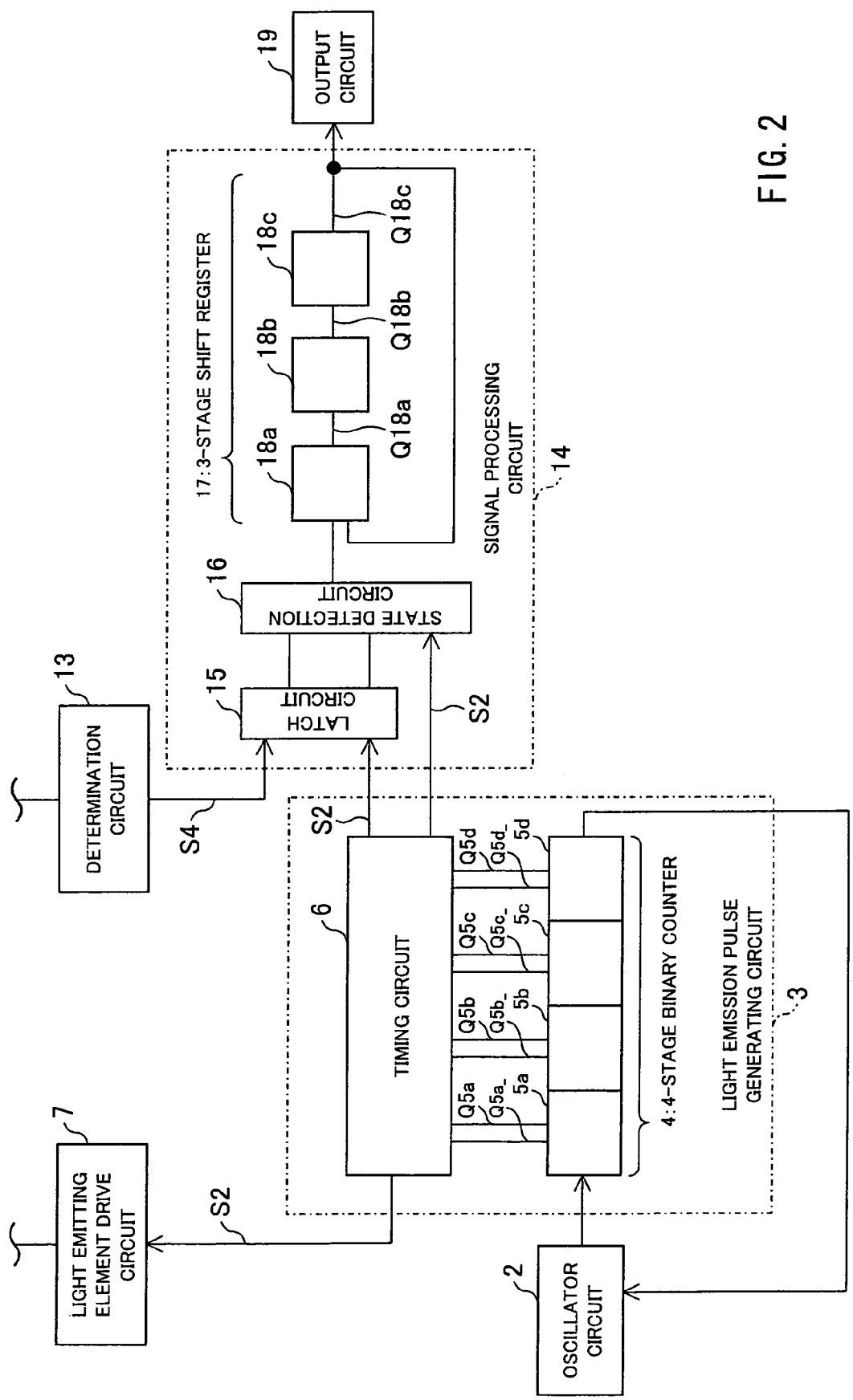
FIG. 2 is a block diagram illustrating a specific structure of the photodetector including a light emission pulse generating circuit and a signal processing circuit.
Figure 3:
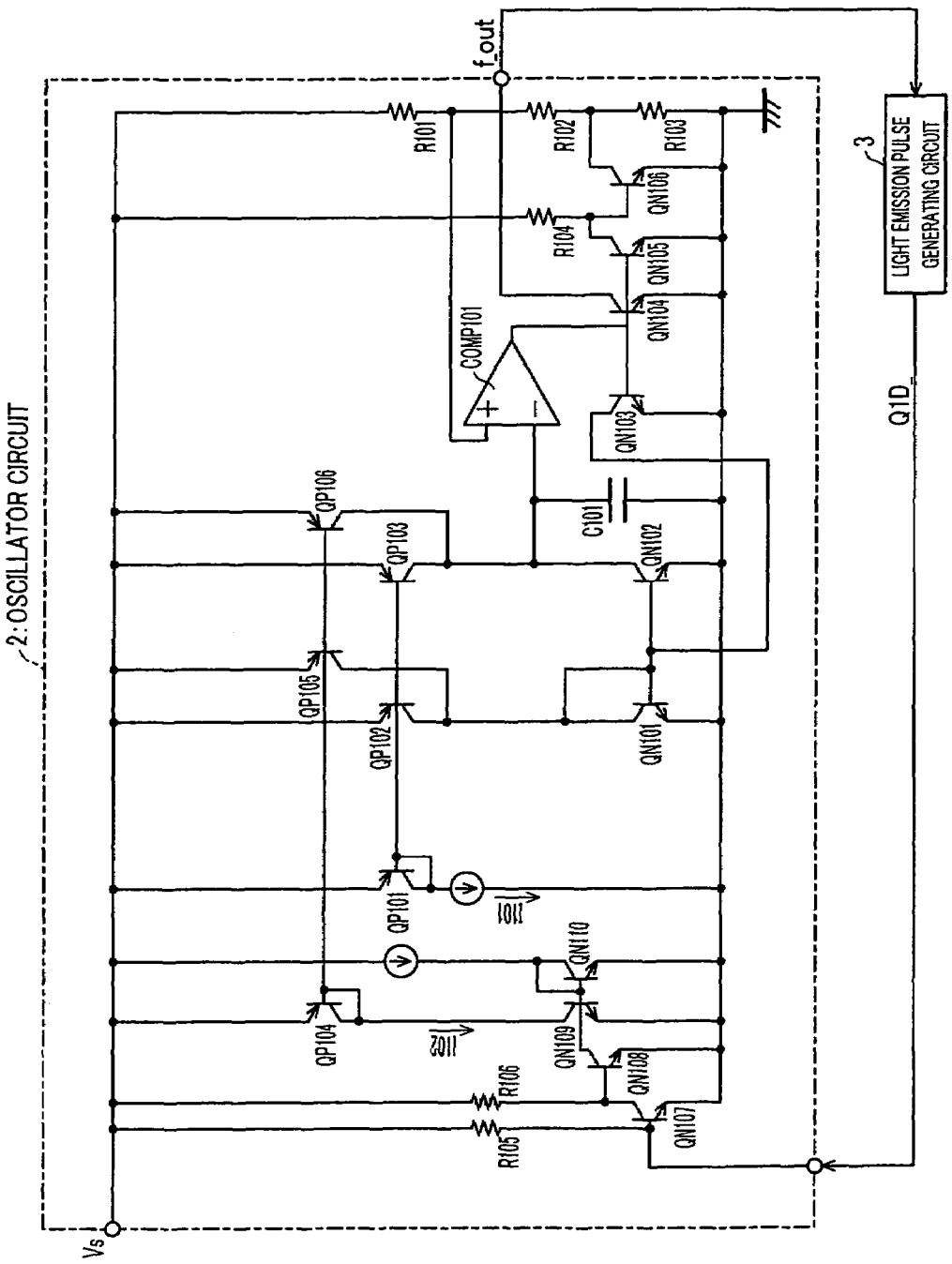
FIG. 3 is a circuit diagram illustrating a circuitry of an oscillator circuit provided in the photodetector.
Figure 4:
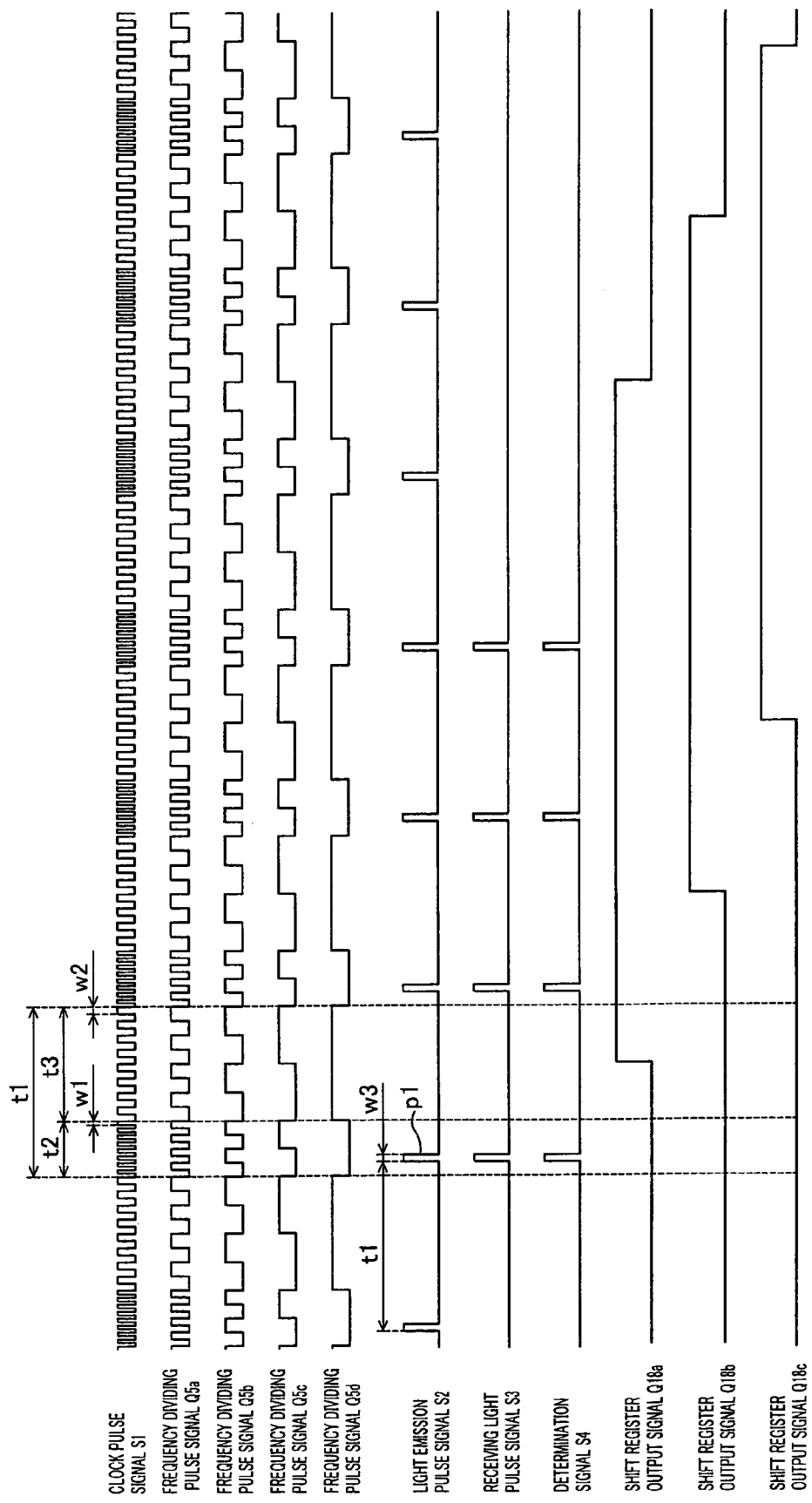
FIG. 4 is a timing chart representing operations of the photodetector.

Referring to FIGS. 1 through 4, the following describes one embodiment of the present invention. FIG. 1 is a block diagram illustrating a structure of a photodetector 1 according to a first embodiment. FIG. 2 is a block diagram illustrating a specific structure of the photodetector 1 including a light emission pulse generating circuit 3 and a signal processing circuit 14. FIG. 3 is a circuit diagram illustrating a circuitry of an oscillator circuit 2 provided in the photodetector 1, and FIG. 4 is a timing chart representing operations of the photodetector 1.

In the photodetector 1 according to the first embodiment, 1 modulation cycle t1 has one light emission timing (light emission pulse 1). When a signal is synchronized by a 3-stage shift register 17 continuously over 3 modulation cycles, the signal is outputted in a high or low level. Further, a clock pulse signal S1 varies in pulse width (pulse width w1 or w3) during 1 modulation cycle t1. Further, in the first embodiment, it is assumed that there is no ambient light.

The photodetector 1 includes the oscillator circuit 2. The oscillator circuit 2 generates the clock pulse signal S1, and provides it to the light emission pulse generating circuit 3. The light emission pulse generating circuit 3 modulates the clock pulse signal S1 received from the oscillator circuit 2, so as to generate and provide a light emission pulse signal S2 to a light emitting element drive circuit 7. The light emission pulse signal S2 has (i) modulation cycles t1, and (ii) light emission pulses p1 each having the pulse width w3. The light emitting element drive circuit 7 drives a light emitting element 8 based on the light emission pulse signal S2 received from the light emission pulse generating circuit 3, causing the light emitting element 8 to project pulsed light 9 having a modulated pulse width.

The pulsed light 9 having a modulated pulse width is reflected by a physical object 10 passing in front of the light emitting element 8 and a light receiving element 11, and is incident on the light receiving element 11. Thus, as long as there is no ambient light in the vicinity, the pulsed light 9 directed to the light receiving element 11 is turned ON or OFF depending on whether or not the physical object 10 passes.

The light receiving element 11 photoelectrically converts the pulsed light 9 reflected by the physical object 10, so as to generate and provide a receiving light pulse signal S3 to an amplifier 12 The amplifier 12 amplifies the receiving light pulse signal S3 received from the light receiving element 11, and provides it to a determination circuit 13. The determination circuit 13 corrugates the receiving light pulse signal S3 thus amplified by the amplifier 12, so as to generate and provide a determination signal S4 to the signal processing circuit 14. Based on the determination signal S4 received from the determination circuit 13, the signal processing circuit 14 outputs a high or level signal to an output circuit 19.

The light emission pulse generating circuit 3 includes a 4-stage binary counter 4. The 4-stage binary counter 4 includes flip flops 5a, 5b, 5c, and 5d, which are connected in series. The light emission pulse generating circuit 3 further includes a timing circuit 6, which generates the light emission pulse signal S2 based on signals outputted from the 4-stage binary counter 4.

The signal processing circuit 14 includes a latch circuit 15, a state detection circuit 16, and a 3-stage shift register 17. The latch circuit 15 latches the determination signal S4 received from the determination circuit 13. Based on the light emission pulse signal S2 generated by the timing circuit 6, the state detection circuit 16 detects a state of a signal outputted from the latch circuit 15. The 3-stage shift register 17 outputs a high or level signal based on the result of detection made by the state detection circuit 16. The 3-stage shift register 17 includes flip flops 18a, 18b, and 18c, which are connected in series.

The timing circuit 6 generates the light emission pulse signal S2 having one light emission timing ($1/(2^4)$ duty (1/16 duty: pulse width w3) in one cycle. As used herein, one cycle (i.e., modulation cycle t1) is constituted by $2^4$ (i.e., 16) basic clocks. The light emission pulse signal S2 is produced from the combination of frequency dividing pulse signals Q5a, Q5a_, Q5b, Q5b_, Q5c, Q5c_, Q5d, and Q5d_, whose frequencies are divided by the flip flops 5a, 5b, 5c, and 5d of the 4-stage binary counter 4.

The timing circuit 6 provides the light emission pulse signal S2 to the light emitting element drive circuit 7. Further, the timing circuit 6 provides the light emission pulse signal S2 to the signal processing circuit 14 by using (i) as a synchronous timing, a time period which corresponds to the pulse width w3 and which indicates the light emission timing and (ii) as asynchronous timing, time periods other than the period corresponding to the light emission timing.

The frequency dividing pulse signal Q5d from the flip flop 5d, i.e., the 4th stage of the 4-stage binary counter 4, is inverted from low to high in the middle of 1 modulation cycle t1. On the contrary, the frequency dividing pulse signal Q5d_ from the flip flop 5d is inverted from high to low in the middle of 1 modulation cycle t1. Such frequency dividing pulse signals Q5d or Q5d_ are provided to the oscillator circuit 2. This causes the oscillator circuit 2 to oscillate a signal (i) with the short pulse width w1 in the first half period (i.e., time period for basic clocks 1 to 8 (light emission period t2)) during which the light emission pulse p1 is present, and (ii) with the long pulse width w3 in the second half period (i.e., time period for basic clocks 9 to 16. (no light emission period t3)) during which the light emission pulse p1 is not present.

In a case where neither ambient light nor the pulsed light from the light emitting element 8 is incident on the light receiving element 11, the determination signal S4, provided from the determination circuit 13 to the signal processing circuit 14, indicates that no pulsed signal is present in the synchronous timing of the determination signal S4. Thus, the state detection circuit 16 determines that there is no signal and no noise, and the flip flops 18a, 18b, and 18c of the 3-stage shift register 17 output shift register output signals Q18a, Q18b, and Q18c in a low level. As such, as long as no pulsed signal is present in the synchronous timing of the determination signal S4 and there is no ambient light, the signal processing circuit 14 outputs a level signal.

In a case where there is no ambient light and where the pulsed light emitted from the light emitting element 8 and reflected by the physical object 10 is incident on the light receiving element 11, the determination signal S4, provided from the determination circuit 13 to the signal processing circuit 14, indicates that the pulsed signal is present in the synchronous timing of the determination signal S4. Therefore, the determination signal S4 is latched by the latch circuit 15, and the state detection circuit 16 determines that there is a signal and no noise. Accordingly, the shift register output signals Q18a, Q18b, and Q18c of the shift register 17 are inverted from low to high, while being transmitted through the three stages. As a result, the output circuit 19 receives the signal in a high level. As such, in the case where there is no ambient light and where the pulsed signal is present in the synchronous timing of the determination signal S4, the signal processing circuit 14 outputs a high level signal.

In order to prevent circuit malfunction and unauthorized use of signal(s), the short clock pulse width w1 in the light emission period t2, during which the light emission pulse p1 is present, is given by the following equation.

$$[\text{clock pulse width } w1] \times [k] \neq [1 \text{ modulation cycle } t1],$$

where k is an integral number of 2 or greater. As such, the short clock pulse width w1 is set so that the modulation cycle t1 cannot be read based on the clock pulse width w1.

Referring to FIG. 3, the following describes a specific structure of the oscillator circuit 2 As shown in FIG. 3, the oscillator circuit 2 includes (i) a constant current source which supplies a constant current I101 for charging or discharging a capacitor C101, and (ii) a constant current source which supplies a constant current I102 The oscillator circuit 2 is arranged so as to turn ON or OFF the two constant current sources according to the state of the frequency dividing pulse signal Q1D_, outputted from the flip flop 5d provided in the 4-stage binary counter 4 of the light emission pulse generating circuit 3. This enables two oscillation frequencies to be switched selectively.

As shown in FIG. 3, in the oscillator circuit 2, the capacitor C101 is provided between an inverting input terminal of a comparator COMP101 and ground. Further, resistors R101, R102, and R103 are connected in series in this order between a constant voltage source Vs and the ground, and a non-inverting input terminal of the comparator COMP101 is connected to a junction provided between the resistors R101 and R102 An output terminal of the comparator COMP101 is connected to bases of transistors QN103, QN104, and QN105, and thus the transistors QN103, QN104, and QN105 can be turned ON or OFF.

When the capacitor C101 is not charged, a voltage of the inverting input terminal of the comparator COMP101 is lower than that of the junction provided between the resistors R101 and R102. This causes the output terminal of the comparator COMP101 to output a high level signal. Accordingly, the transistor QN105 is turned ON and a transistor QN106 is turned OFF. As a result, the non-inverting input terminal of the comparator COMP101 can receive a maximum voltage Vmax found by the following equation:

$$Vmax=\{(R102+R103)\times Vs\}/(R101+R102+R103),$$

where Vs is a constant voltage of the oscillator circuit 2.

As will be described later, the capacitor C101 is charged by a constant current (I101+I102) or the constant current I101 until the voltage of the non-inverting input terminal of the comparator COMP101. reaches the Vmax. Then, when the voltage of the non-inverting input terminal exceeds the Vmax, a level signal is outputted from the output terminal of the comparator COMP101. This causes the transistor QN105 to be turned OFF and the transistor QN106 to be turned ON. As a result, the non-inverting input terminal of the comparator COMP101 can receive a minimum voltage Vmin found by the following equation:

$$Vmin=(R102\times Vs)/(R101+R102+R103)+Vsat(QN106),$$

where Vsat (QN106) is a saturation voltage of the transistor QN106, which is not more than 0.1V.

Since the comparator COMP101 outputs a low level signal, the transistor QN103 is turned OFF, and transistors QN101 and QN102 constituting a current mirror circuit are turned ON. Accordingly, (i) the constant current (I101+I102) supplied from the transistors QN103 and QN106 or the constant current I101 and (ii) electric charges charged by the capacitor C101 are discharged by the current (I101+I102) or I101 until the voltage of the non-inverting input terminal reaches Vmin. With the above operations, the oscillator circuit 2 has an oscillation frequency fo found by the following equation.

$$fo=(I101+I102)/\{2\times C101\times(Vmax-Vmin)\}$$

Note that, in the present embodiment, the transistors QN101 and QN102 are set so as to have an emitter area ratio of 1:2.

When the frequency dividing pulse signal Q1D_ is outputted in a high level from the flip flop 5d provided in the 4-stage binary counter 4 of the light emission pulse generating circuit 3 to a base of a transistor QN107 of the oscillator circuit 2, the transistor QN107 is turned ON and a transistor QN108 is turned OFF. Accordingly, the constant current I102 flows through a transistor QN109 constituting a current mirror circuit with a transistor QN110, also through transistors QP104, QP105, and QP106, which mutually a constitute current mirror circuit. Further, since the constant current I101 is constantly flows through transistors QP101, QP102, and QP103 which mutually constitute a current mirror circuit, the capacitor C101 is charged or discharged by the constant current (I101+I102). The oscillator circuit 10 has an oscillation frequency fo101 found by the following equation.

$$fo101=(I101+I102)/\{2\times C101\times(Vmax-Vmin)\}$$

On the contrary, when the frequency dividing pulse signal Q1D_ is outputted in a low level from the flip flop 5d provided in the 4-stage binary counter 4 of the light emission pulse generating circuit 3 to the base of the transistor QN107 of the oscillator circuit 2, the transistor QN107 is turned OFF and the transistor QN108 is turned ON, causing the constant current 1102 to flow through the transistor QN108. This causes the transistors QN109 and QN110 to be turned OFF. Accordingly, the transistors QN104, QN105, and QN106, which mutually constitute a current mirror circuit, are turned OFF. On the other hand, the constant current I101 constantly flows through the transistors QP101, QP102, and QP103, which a mutually constitute current mirror circuit. As a result, the capacitor C101 is charged or discharged only by the constant current I101. The oscillator circuit 2 has an oscillation frequency found by the following equation.

$$fo102=(I101)/\{2\times C101\times(Vmax-Vmin)\}$$

As described above, when the capacitor C101 is charged or discharged by the constant current (I101+I102), the transistor QN104 outputs via its collector, i.e., output terminal (fout) a signal having an increased oscillation frequency. On the contrary, when the capacitor C101 is charged or discharge by the current (I101), the transistor QN104 outputs via the collector, i.e., output terminal (fout) a signal having a reduced oscillation frequency.

In the first embodiment, the foregoing describes by way of example the reflective photodetector 1 which detects presence or absence of the physical object 10, based on whether or not pulsed light reflected by the physical object 10 passing in front of the light emitting element 8 and the light receiving element 11 is received. However, the present invention is not limited to this example. It is easily understood for a person skilled in the art that the present invention is applied to transmissive photodetectors which detect presence or absence of a physical object based on whether pulsed light emitted from a light emitting element is received by a light receiving element, or not by a physical object passing in front of the light emitting element and the light receiving element.

Further, in the first embodiment, the foregoing describes the case where the light emission pulse p1 is present in the first half of 1 modulation cycle t1. However, the present invention is not limited to this, and the light emission pulse p1 may be present in the second half of 1 modulation cycle t1. In this case, in 1 modulation cycle t1. it is set such that the short clock pulse width w3 during which the light emission pulse p1 is present in the second half period, and the long clock pulse width w1 during which the light emission pulse p1 is not present in the first half period.

Further, in the foregoing description, the clock pulse signal S1 has an increased frequency when the frequency dividing pulse signal Q5d is in a low level. However, the present invention is not limited to this. The clock pulse signal S1 may have an increased frequency when the frequency dividing pulse signal Q5d is in a high level.

Further, the binary counter 4 of the first embodiment has 4 stages, a frequency dividing pulse signal is outputted from the 4th stage so as to control the oscillator circuit 2 However, the present invention is not limited to this. The binary counter may have n stages, not 4 stages (n is an integral number of 2 or greater). Further, a frequency dividing pulse signal may not be necessarily obtained from the nth binary counter, i.e., the end circuit. As long as the light emission pulse p1 is present in a time period during which a clock pulse width is short, a frequency dividing pulse signal may be obtained from n−1th or n−2th flip flop to be provided to an oscillator circuit.

Second Embodiment

Figure 5:
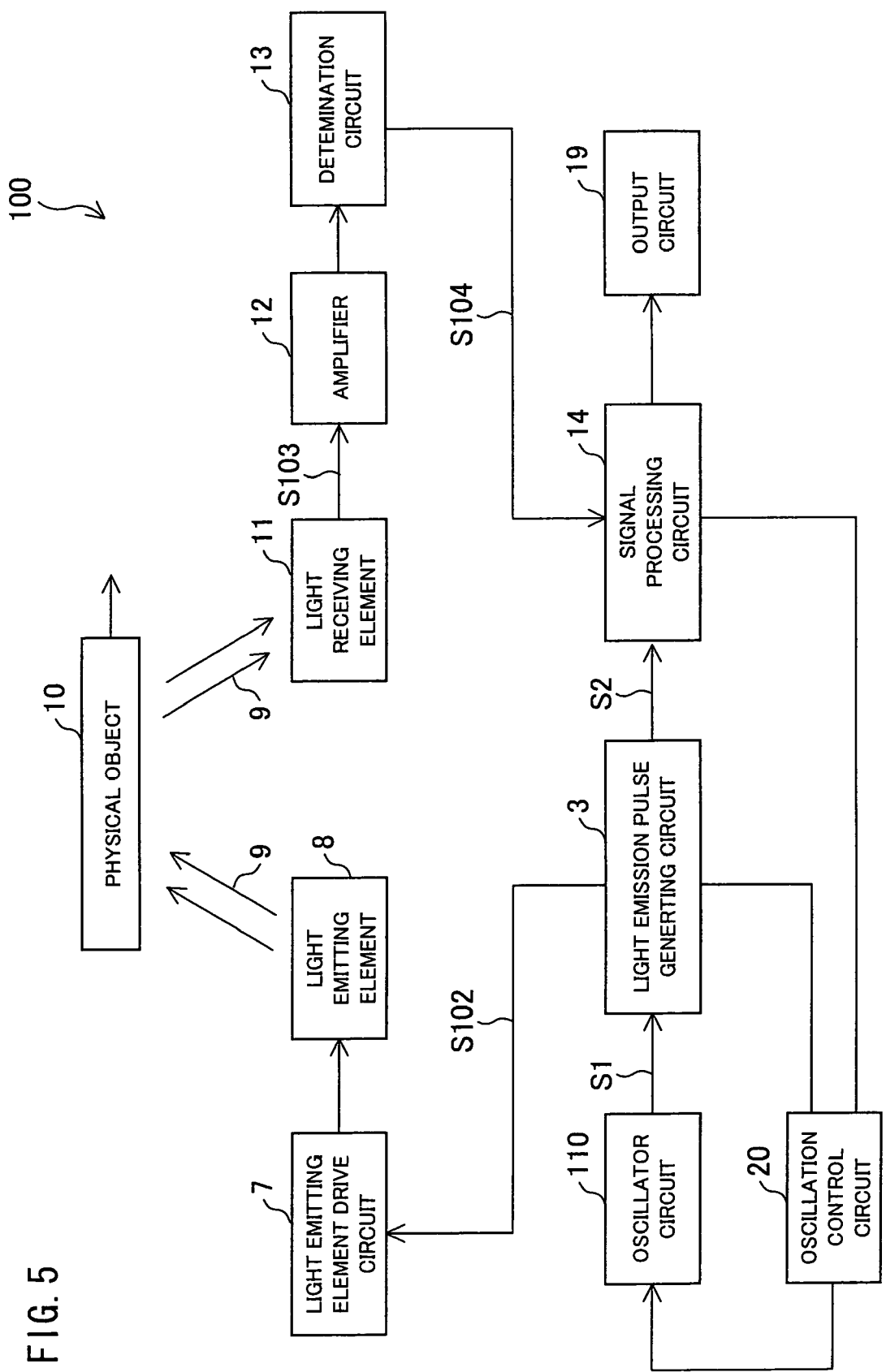
FIG. 5 is a block diagram illustrating a structure of a photodetector according to a second embodiment.
Figure 6:
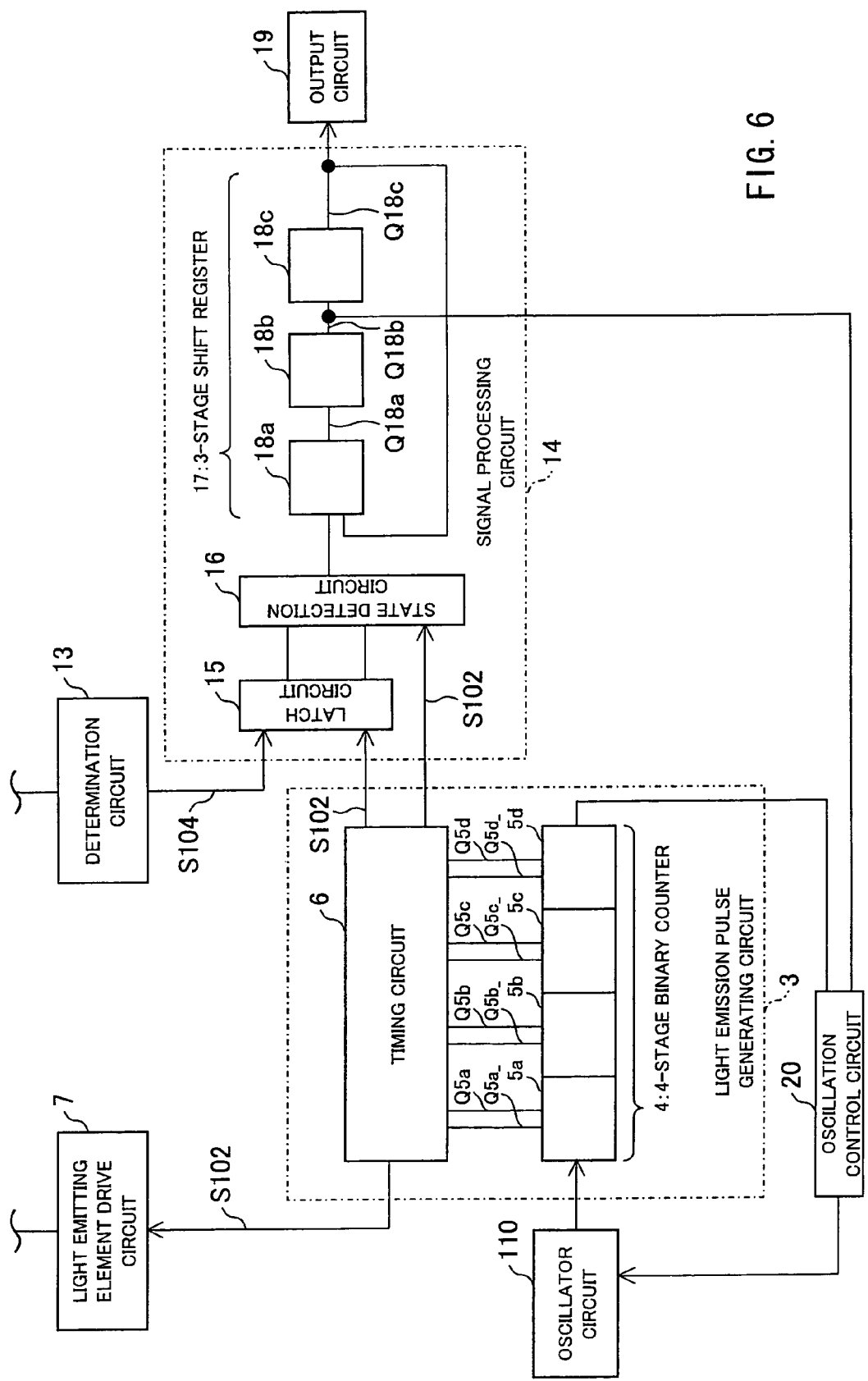
FIG. 6 is a block diagram illustrating a specific structure of the photodetector including a light emission pulse generating circuit and a signal processing circuit.
Figure 7:
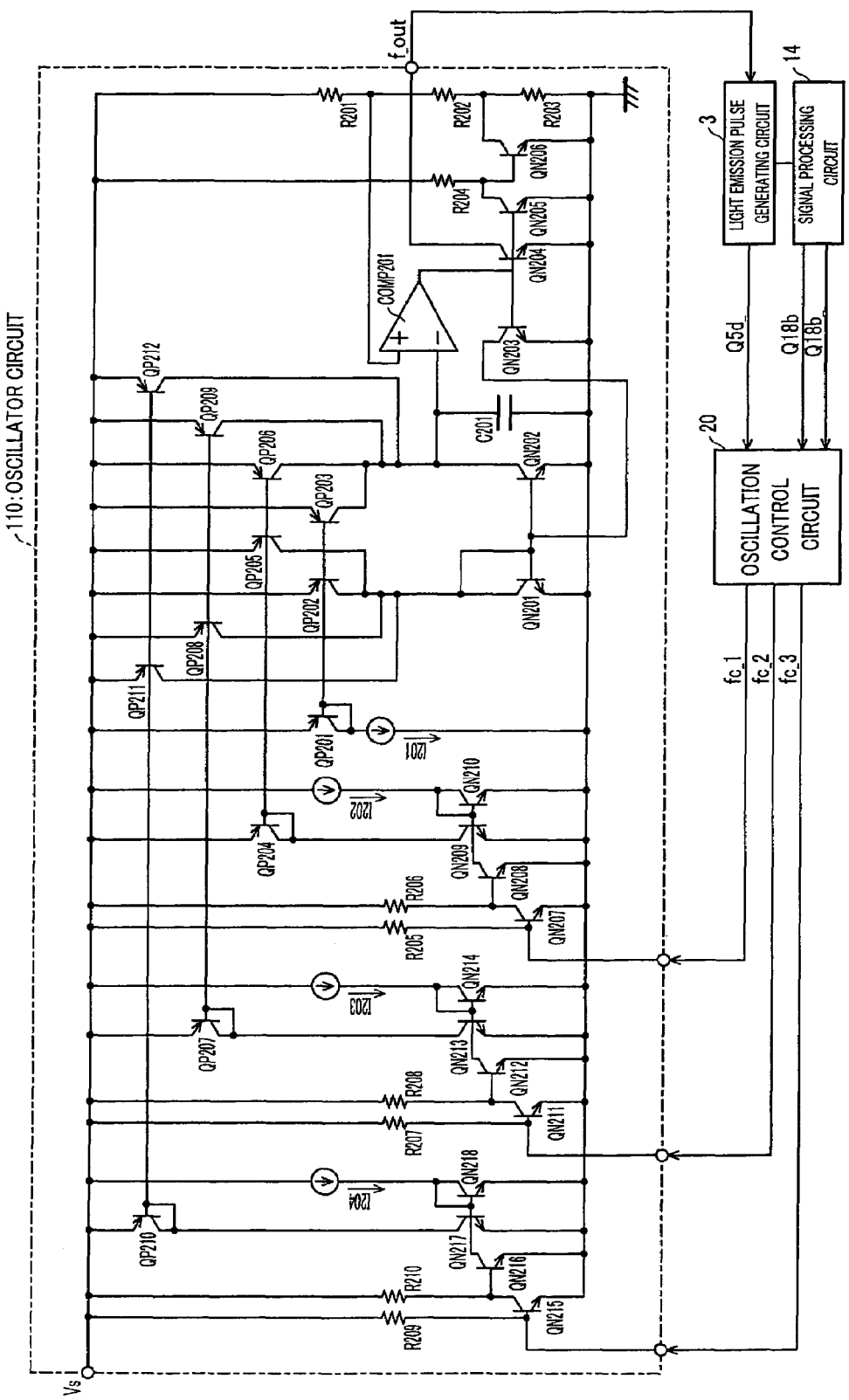
FIG. 7 is a circuit diagram illustrating a circuitry of an oscillator circuit provided in the photodetector.
Figure 8:
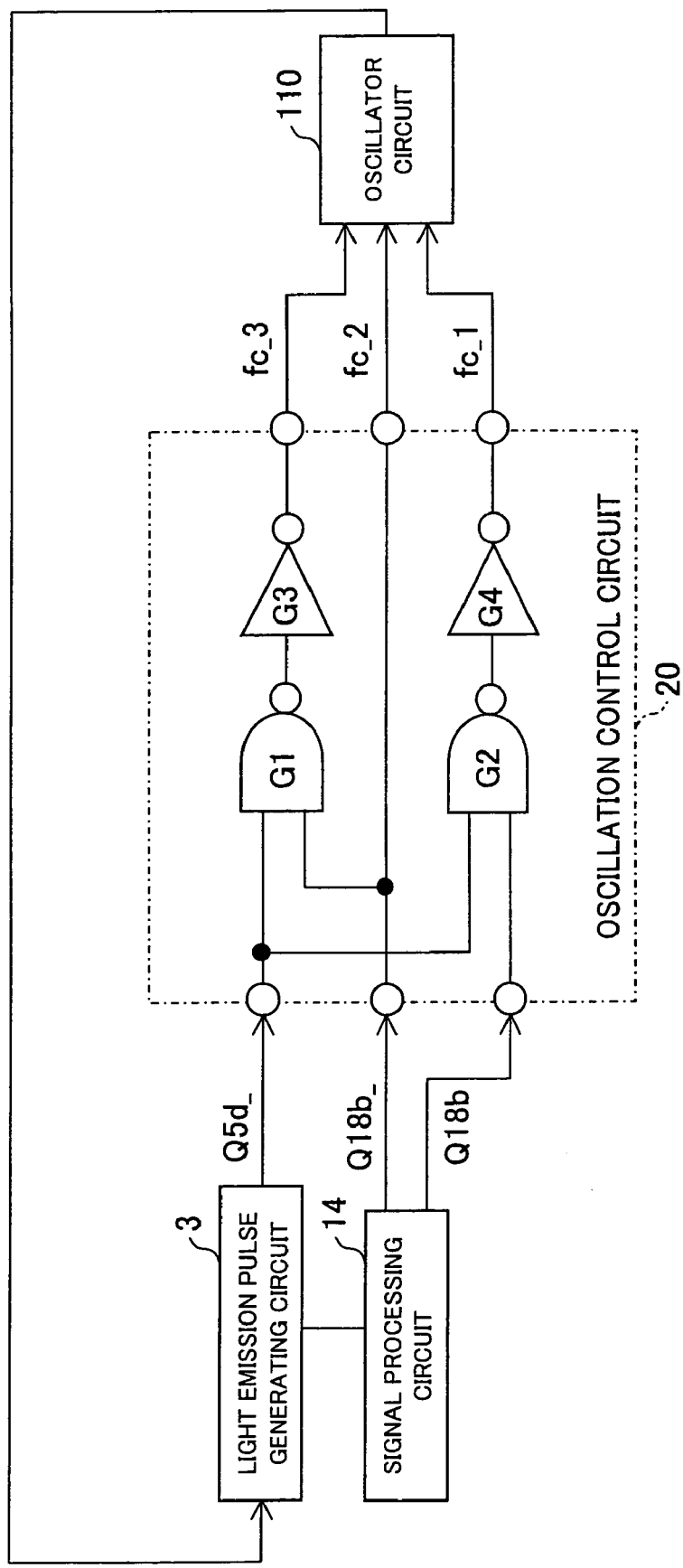
FIG. 8 is a circuit diagram illustrating a circuitry of an oscillation control circuit provided in the photodetector.
Figure 9:
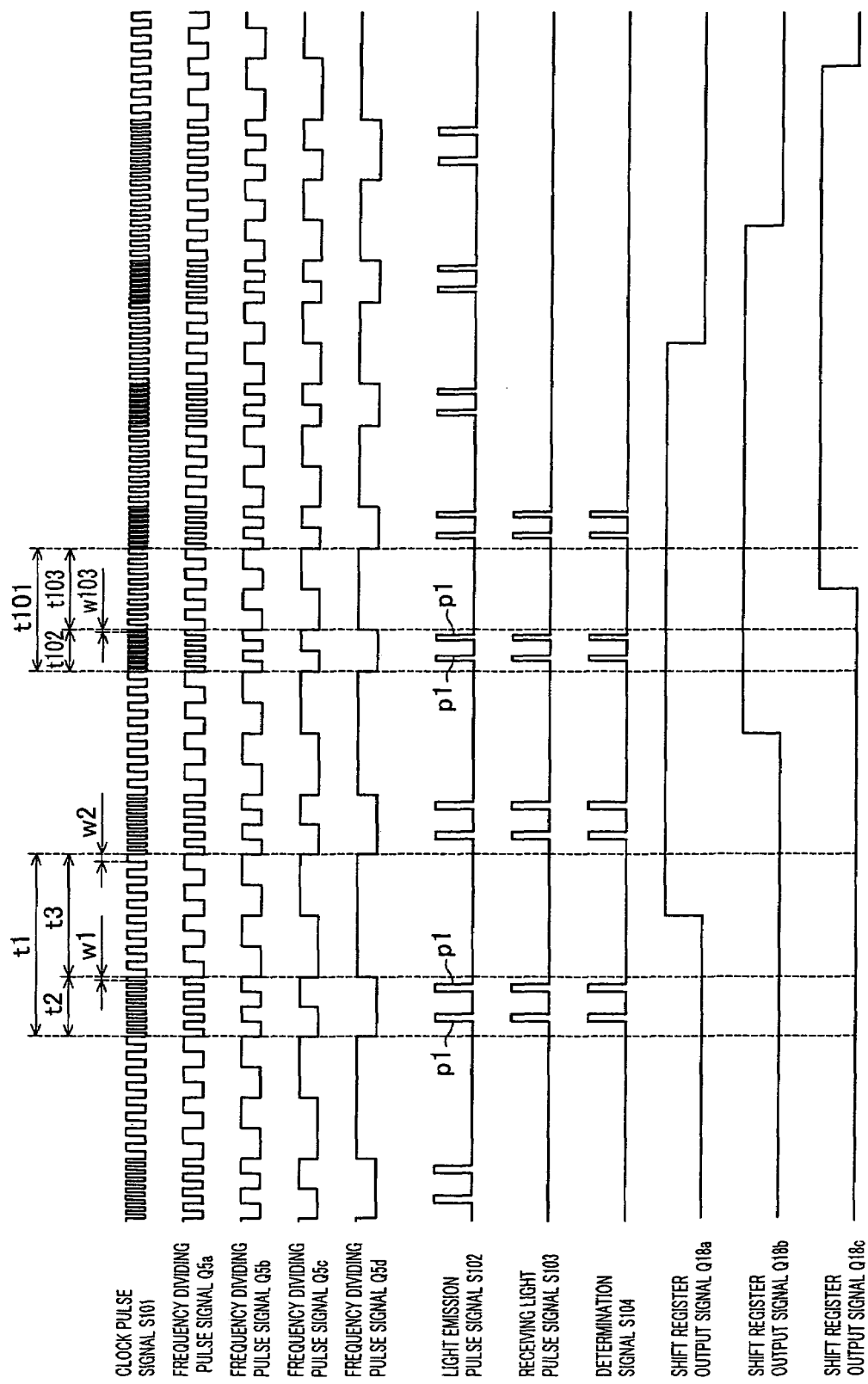
FIG. 9 is a timing chart representing operations of the photodetector.
Figure 10:
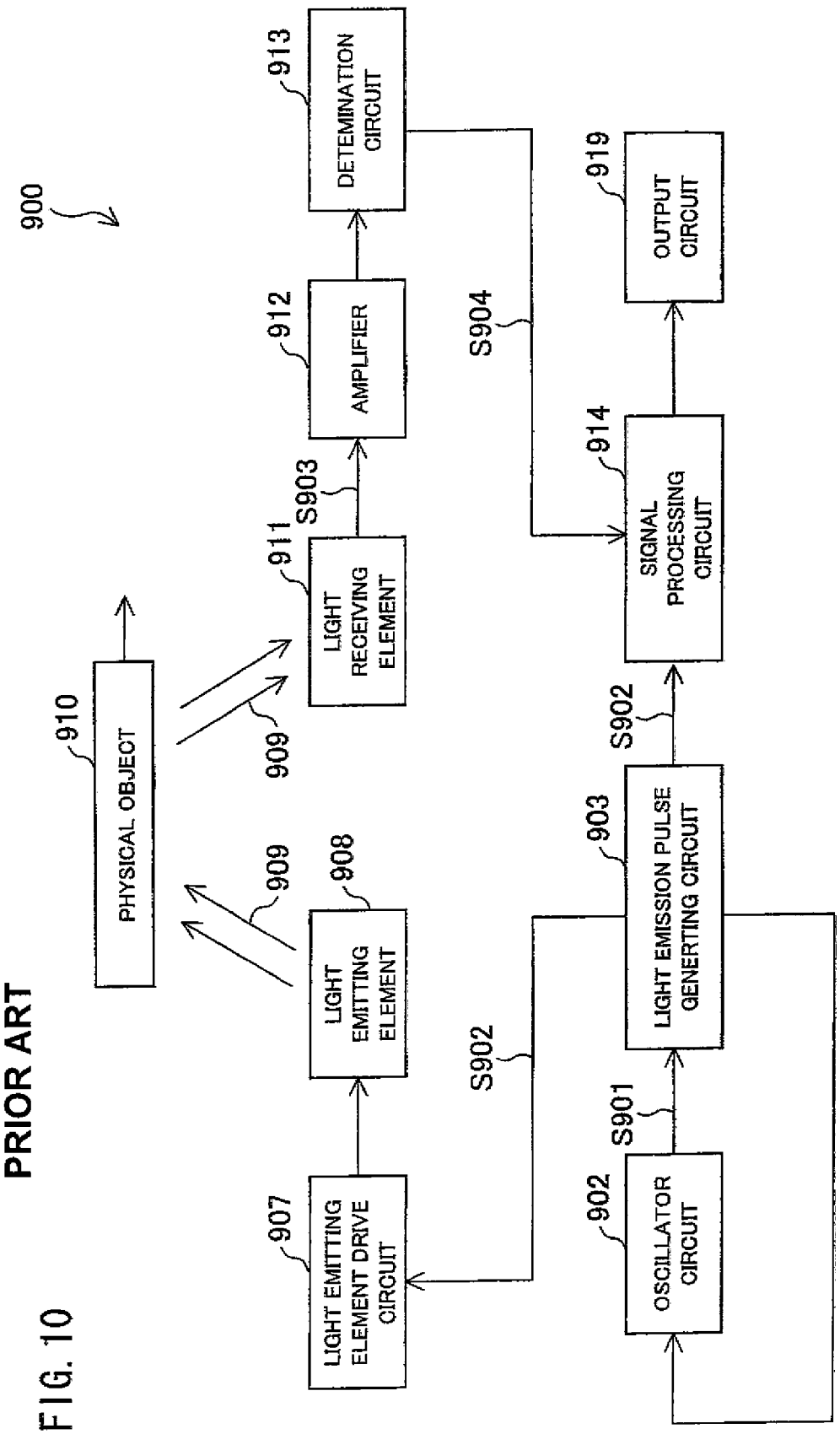
FIG. 10 is a block diagram illustrating a structure of a conventional photodetector.
Figure 11:
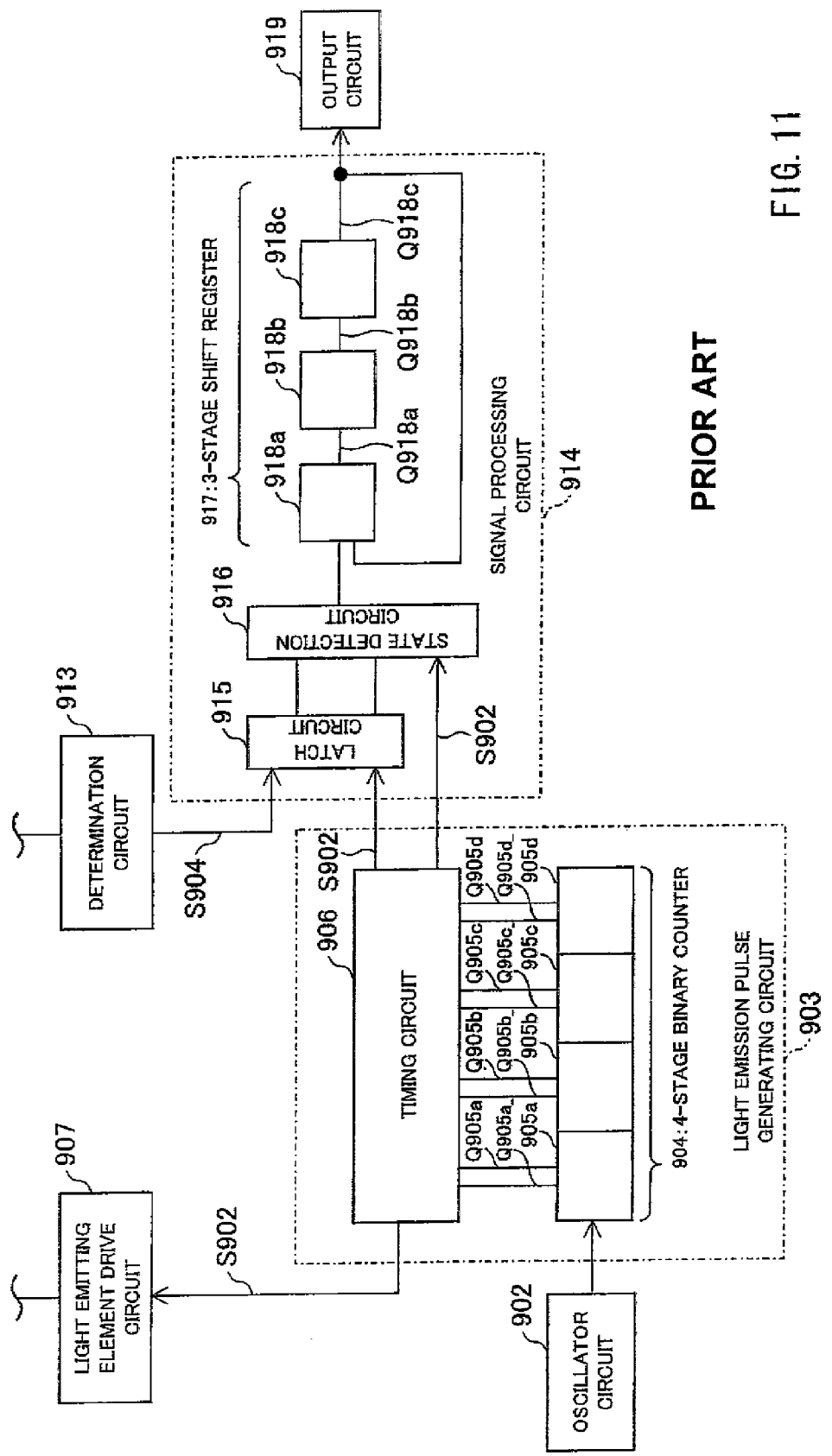
FIG. 11 is a block diagram illustrating a specific structure of the photodetector including a light emission pulse generating circuit and a signal processing circuit.

FIG. 5 is a block diagram illustrating a structure of a photodetector 100 according to a second embodiment. FIG. 6 is a block diagram illustrating a specific structure of the photodetector 100 including a light emission pulse generating circuit 3 and a signal processing circuit 14. FIG. 7 is a circuit diagram illustrating a circuitry of an oscillator circuit 110 provided in the photodetector 100, and FIG. 8 is a circuit diagram illustrating a circuitry of an oscillation control circuit 20 provided in the photodetector 100. Further, FIG. 9 is a timing chart representing operations of the photodetector 100. Constituting elements being the same as those described in the first embodiment are indicated by the same reference numerals, and their detailed explanations are omitted.

In the second embodiment, two light emission pulses p1 are present in 1 modulation cycle t1. Further, when a signal is synchronized by a 3-stage shift register 17 continuously over 3 modulation cycles, the signal is outputted in a high or low level and a basic clock pulse width of a clock pulse signal S101 varies within 1 modulation cycle t1. Further, the basic clock pulse width of the clock pulse signal S101 varies (i) when shift register output signals Q18a, Q18b, and Q18c from flip flops 18a, 18b, and 18c of the 3-stage shift register 17 in the signal processing circuit 14 are inverted from low to high, or (ii) when the shift register output signals Q18a, Q18b, and Q18c are inverted from high to low. Further, the following describes a case where there is no ambient light.

The photodetector 100 includes the oscillation control circuit 20. The oscillation control circuit 20 generates oscillation frequency switching signals fc_1, fc_2, and fc_3, based on (i) the shift register output signal Q18b from the flip flop 18b of the 3-stage shift register 17 and (ii) a frequency dividing pulse signal Q5d from a flip flop 5d of a 4-stage binary counter 4. Then, the oscillation control circuit 20 provides the oscillation frequency switching signals fc_1, and fc_2, and fc_3 thus generated to an oscillator circuit 110. Based on the oscillation frequency switching signals fc_1, fc_2, and fc_3 received from the oscillation control circuit 20, the oscillator circuit 110 switches an oscillation frequency of the clock pulse signal S101.

The frequency dividing pulse signal Q5d from the flip flop 5d, i.e., the 4th stage of the 4-stage binary counter 4, is inverted from low to high in the middle of 1 modulation cycle 1. Further, a frequency dividing pulse signal Q5d_ from the flip flop 5d is inverted from high to low in the middle of 1 modulation cycle t1. The frequency dividing pulse signal Q5d or Q5d_ is provided to the oscillation control circuit 20, and is further provided from the oscillation control circuit 20 to the oscillator circuit 110. This causes the oscillator circuit 110 to oscillate the signal (i) with a short pulse width w1 in the first half period (i.e., time period for basic clocks 1 to 8 (light emission period t2)) during which the light emission pulse p1 is present, and (ii) with a long pulse width w3 in the second half period (i.e., time period for basic clocks 9 to 16 (no light emission period t3)).

In a case where neither ambient light nor pulsed light 9 from a light emitting element 8 is incident on a light receiving element 11, a determination signal S104, provided from the determination circuit 13 to the signal processing circuit 14, indicates that no pulsed signal is present in the synchronous timing of the determination signal S104. Thus, a state detection circuit 16 determines that there is no signal and no noise, and the 3-stage shift register 17 outputs a low level signal. As such, as long as no signal is synchronized and there is no ambient light, the signal processing circuit 14 outputs a low level signal.

In a case where there is no ambient light and where the pulsed light 9 emitted from the light emitting element 8 and reflected by a physical object 10 is incident on the light receiving element 11, the determination signal S104, provided from the determination circuit 13 to the signal processing circuit 14, indicates that the pulse signal is present in the synchronous timing of the determination signal S104. Therefore, the determination signal S104 is latched by a latch circuit 15, and the state detection circuit 16 determines that there is a signal and no noise. Accordingly, the shift register output signals Q18a, Q18b, and Q18c of the shift register 17 are inverted from low to high while being transmitted through the three stages. As a result, an output circuit 19 receives a signal in a high level.

Here, the shift register signal Q18b or Q18b_ is provided from the flip flop 18b, i.e., the 2nd stage of the 3-stage shift register 17, to the oscillation control circuit 20. Further, the oscillation frequency switching signals fc_1, fc_2, and fc_3 are provided from the oscillation control circuit 20 to the oscillator circuit 110, causing the clock pulse width of the clock pulse signal S101 to be varied. As long as there is no ambient light and a pulse signal is detected, the signal processing circuit 14 outputs a high level signal. Further, in a case where there is no ambient light and where pulsed light is first incident on the light receiving element 11 and then blocked, the above operations are carried out in a similar manner. Specifically, according to a signal from the state detection circuit 16, the shift register output signals Q18a, Q18b, and Q18c from the flip flops 18a, 18b, and 18c of the 3-stage shift register 17 become low sequentially, and the shift register output signal Q18b or Q18b_ is provided from the flip flop 18b, i.e., the 2nd stage of the 3-stage shift register 17, to the oscillation control circuit 20. The oscillation frequency switching signals fc_1, fc_2, and fc_3 are further provided from the oscillation control circuit 20 to the oscillator circuit 110, causing the clock pulse width of the clock pulse signal S101 to be varied. Specifically, it is arranged to set the long pulse width w1 for the time period during which the physical object 10 is not detected, and the short pulse width w103 for the time period during which the object is detected.

Referring to FIG. 7, the following describes a specific structure of the oscillator circuit 110. As shown in FIG. 7, the oscillator circuit 110 receives the oscillation frequency switching signals fc_1, fc_2, and fc_3 from the oscillation control circuit 20. The oscillation frequency switching signals fc_1, fc_2, and fc_3 are produced based on (i) the state of the frequency dividing pulse signal Q5d_ from the flip flop 5d provided in the 4-stage binary counter 4 of the light emission pulse generating circuit 3 and (ii) the shift register output signals Q18b or Q18b_ from the flip flop 18b, i.e., the 2nd circuit of the 3-stage shift register 17 provided in the signal processing circuit 14.

The oscillator circuit 110 includes 4 constant current sources which supply constant currents I201, I202, I203, and I204, respectively. The constant currents I201, I202, I203, and I204 are used to charge or discharge a capacitor C201 of FIG. 7. Based on the oscillation frequency switching signals fc_1, fc_2, and fc_3 received from the oscillation control circuit 20, the oscillator circuit 110 turns ON or OFF the 4 constant current sources, so as to switch 4 oscillation frequencies selectively.

As shown in FIG. 7, in the oscillator circuit 110, the capacitor C201 is provided between an inverting input terminal of a comparator COMP201 and ground. Further, resistors R201, R202, and R203 are connected in series in this order between a constant voltage source Vs and the ground, and a non-inverting input terminal of the comparator COMP201 is connected to a junction provided between the resistors R101 and R102 An output terminal of the comparator COMP201 is connected to bases of transistors QN203, QN204, and QN205, and thus the transistors QN203, QN204, and QN205 can be turned ON or OFF.

When the capacitor C201 is not charged, a voltage of the inverting input terminal of the comparator COMP201 is lower than that of the junction provided between the resistors R201 and R202. This causes the output terminal of the comparator COMP201 to output a high level signal. Accordingly, the transistor QN205 is turned ON and a transistor QN206 is turned OFF. As a result, the non-inverting input terminal of the comparator COMP201 can receive a maximum voltage Vmax found by the following equation:

$$V_{max} = \{(R202+R203) \times Vs\}/(R201+R202+R203),$$

where Vs is a constant voltage of the oscillator circuit 110. As will be described later, the capacitor C201 is charged by the combination of the constant currents I201, I202, I203, and I204 until the voltage of the non-inverting input terminal of the comparator COMP201 reaches the Vmax. Then, when the voltage of the non-inverting input terminal exceeds the Vmax, a low level signal is outputted from the output terminal of the comparator COMP201. This causes the transistor QN205 to be turned OFF and the transistor QN206 to be turned ON. As a result, the non-inverting input terminal of the comparator COMP201 can receive a minimum voltage Vmin found by the following equation:

$$V_{min} = (R202 \times Vs)/(R201+R202+R203) + V_{sat}(QN206),$$

where Vsat (QN206) is a saturation voltage of the transistor QN206, which is not more than 0.1V. Further, since the comparator COMP201 outputs a low level signal, the transistor QN203 is turned OFF, and transistors QN201 and QN202 constituting a current mirror circuit are turned ON. Accordingly, the transistor QN202 discharges electric charges, charged in the capacitor C201, by the combination of the constant currents I201, I202, I203, and I204 as will be described later, until the voltage of the non-inverting input terminal of the comparator COMP201 reaches Vmin. With the above operations, the oscillator circuit 110 has an oscillation frequency fo found by the following equation.

$$fo = (I201+I202+I203+I204)/\{2 \times C201 \times (V_{max}-V_{min})\}$$

Note that, in the present embodiment, the transistors QN201 and QN202 are set so as to have an emitter area ratio of 1:2. When the oscillator circuit 110 receives the oscillation frequency switching signals fc_1, fc_2, and fc_3 in the following states: e.g. fc_1: high, fc_2: low, and fc_3: low, a transistor QN207 is turned ON, a transistor QN208 is turned OFF, a transistor QN211 is turned OFF, a transistor QN212 is turned ON, a transistor QN215 is turned OFF, and a transistor QN216 is turned ON. This causes (i) the constant current I202 to flow through a transistor QN210, (ii) the constant current I203 to flow through the transistor QN212, and (iii) the constant current I204 to flow through the transistor QN216.

Accordingly, the constant current I202 flows through a transistor QN209 constituting a current mirror circuit with the transistor QN210, also through transistors QP204, QP205, QP206, which mutually constitute a current mirror circuit. On the other hand, transistors QN213 and QN217 are turned OFF. Since the constant current I201 constantly flows through transistors QP201, QP202, and QP203, the capacitor C201 is charged or discharged by a constant current (I201+I202). The oscillator circuit 110 has an oscillation frequency fo201 found by the following equation.

$$fo201 = (I201+I202)/\{2 \times C201 \times (V_{max}-V_{min})\}$$

As shown in FIG. 8, the oscillation control circuit 20 receives (i) the frequency dividing pulse signal Q5d_ from the flip flop 5d provided in the 4-stage binary counter 4 of the light emission pulse generating circuit 3, and (ii) the shift register output signals Q18b or Q18b_ from the flip flop 18b provided in the 3-stage shift register 17 of the signal processing circuit 14. The oscillation control circuit 20 includes NAND elements G1 and G2 and inverters G3 and G4, and outputs to the oscillator circuit 110 the oscillation frequency switching signals fc_1, fc_2, and fc_3 in the combination from the frequency dividing pulse signal Q5d_, the shift register output signals Q18b or Q18b_ as shown in Table 1.

TABLE 1

| | | | | | |
|---|---|---|---|---|---|
| SIGNAL PROCESSING CIRCUIT 14 | Q18b | | Hi | | Lo |
| | Q18b_ | | Lo | | Hi |
| LIGHT EMISSION PULSE GENERATING CIRCUIT 3 | Q5d_ | Hi | Lo | Hi | Lo |
| OSCILLATION CONTROL CIRCUIT 20 | fc_1 | Hi | Lo | Lo | Lo |
| | fc_2 | Lo | Lo | Hi | Hi |
| | fc_3 | Lo | Lo | Hi | Lo |
| OSCILLATOR CIRCUIT 110 | I201 | ON | ON | ON | ON |
| | I202 | ON | OFF | OFF | OFF |
| | I203 | OFF | OFF | ON | ON |
| | I204 | OFF | OFF | ON | OFF |
| OSCILLATION FREQUENCY | | fo201 | fo202 | fo203 | fo204 |

Further, according to the oscillation frequency switching signals fc_1, fc_2, and fc_3, the constant currents I201, I202, I203, and I204 are turned ON or OFF in the combination shown in Table 1 in the similar manner described above, so as to charge or discharge the capacitor C201. The oscillator circuit 110 has oscillation frequencies fo201, fo202, fo203, and fo204 found by the following equations.

$$fo201 = (I201+I202)/\{2 \times C201 \times (V_{max}-V_{min})\}$$

$$fo202 = (I201)/\{2 \times C201 \times (V_{max}-V_{min})\}$$

$$fo203 = (I201+I203+I204)/\{2 \times C201 \times (V_{max}-V_{min})\}$$

$$fo204 = (I201+I203)/\{2 \times C201 \times (V_{max}-V_{min})\}$$

In the second embodiment, the foregoing describes the case where the light emission pulse p1 is present twice during 1 modulation cycle t1. However, the present invention is not limited to this case. As long as the number of base clock(s) allows which are provided in the clock pulse signal S 101 and which constitute 1 modulation cycle t1, the light emission pulse p1 may be present three times or more. The more the light emission pulse p1 is present, the less the oscillator circuit 110 malfunctions. It should be noted, however, that the number of times for driving the light emitting elements 8 is the same as the number of times the light emission pulse p1 is present, and that the consumption current increases as the number of the light emission pulse p1 during 1 modulation cycle t2 increases.

Further, in the second embodiment, the foregoing describes the case where the shift register output signal Q18*b* is obtained from the flip flop 18*b*, i.e., the 2nd stage of the 3-stage shift register 17, and is provided to the oscillation control circuit 20. However, the present invention is not limited to this case. The shift register may include n stages, not 3 stages (n is an integral number of 2 or greater). As long as an area of the layout and response speed of the shift register allow, the more stages the shift register has, the less the oscillator circuit 110 malfunctions.

The present invention is not limited to the description of the embodiments above, but may be altered within the scope of the claims. An embodiment based on a proper combination of technical means disclosed in different embodiments is encompassed in the technical scope of the present invention.

The present invention is applied to a pulse modulation photodetector and an electronic device which detect presence or absence of an object by projecting light having a modulated pulse width onto a light emitting element. Preferably, the present invention is applied particularly to (i) FA and OA devices such as copiers and printers, (ii) electronic devices such as amusement devices for detecting coins or balls.

In the pulse modulation photodetector of the present embodiment, it is preferable that (k×the pulse width of the clock pulse signal in the light emission period) be different from the modulation cycle (k is an integral number of 2 or greater).

According to the arrangement, even if the pulse width of the clock pulse signal in the light emission period is read, it is impossible to find a modulation cycle based on the pulse width thus read. Therefore, when a pulse modulation photodetector is installed in an electronic device such as an amusement device for detecting a coin or ball as a physical object, it is possible to prevent unauthorized use of signal(s), i.e., decoding operations of the amusement device based on the modulation cycle without authorization.

It is preferable that the pulse modulation photodetector of the present embodiment include: an oscillator circuit for generating the clock pulse signal; and a light emission pulse generating circuit for generating the light emission pulse, based on the clock pulse signal thus generated by the oscillator circuit, the light emission pulse generating circuit, including: an n-stage binary counter (n is an integral number of 2 or greater) for generating a frequency dividing pulse signal by dividing frequencies of the clock pulse signal; and a timing circuit for generating the light emission pulse, based on the frequency dividing pulse signal generated by the n-stage binary counter, the oscillator circuit changing the pulse width of the clock pulse signal, based on the frequency dividing pulse signal generated by the n-stage binary counter.

According to the arrangement, with a simple configuration, it is possible to set the pulse width of the clock pulse signal in the light emission period, during which the light emission pulse is generated, to be shorter than a pulse width of the clock pulse signal in the no light emission period.

It is preferable in the pulse modulation photodetector of the present embodiment that the oscillator circuit change the pulse width, based on a frequency dividing pulse signal outputted from an nth flip flop of the n-stage binary counter.

According to the arrangement, with a simple configuration, it is possible to set the pulse width of the clock pulse signal in the light emission period, during which the light emission pulse is generated, to be shorter than a pulse width of the clock pulse signal in the no light emission period.

It is preferable that the pulse modulation photodetector of the present embodiment include: a light receiving element for receiving the pulsed light reflected by the physical object, so as to generate a receiving light pulse; and a signal processing circuit for counting a signal derived from the light receiving pulse generated by the light receiving element, so as to detect presence or absence of the physical object, the oscillator circuit changing the pulse width of the clock pulse signal according to a result of counting performed by the signal processing circuit.

According to the arrangement, the pulse width of the clock pulse signal is changed according to a result of counting performed by the signal processing circuit. This enables the pulse width in the light emission period, during which the signal processing circuit completes the counting operation and the physical object is detected, to be further shorter than a pulse width in the non light emission period during which the signal processing circuit has not completed the counting operation and has not detected the physical object.

It is preferable in the pulse modulation photodetector of the present embodiment that the light emission pulse be generated more than one time in 1 modulation cycle.

According to the arrangement, since the light emission pulse is generated more than one time in 1 modulation cycle, the pulsed light is projected more than one time in 1 modulation cycle. This causes circuit malfunction less likely, compared to an arrangement where the pulsed light is projected once in 1 modulation cycle. Thus, the pulse modulation photodetector achieves improved reliability.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A pulse modulation photodetector, which detects, by projecting pulsed light, presence or absence of a physical object based on whether the pulsed light is received or not according to passage of the physical object, the pulsed light having a pulse width modulated according to a light emission pulse which is generated based on a clock pulse signal and which has a modulation cycle, the modulation cycle, including:
a light emission period during which the light emission pulse is present; and
a non light emission period other than the light emission period,
the clock pulse signal having a pulse width being shorter in the light emission period than in the non light emission period.

2. The pulse modulation photodetector according to claim 1, wherein (k× the pulse width of the clock pulse signal in the light emission period) is different from the modulation cycle (k is an integral number of 2 or greater).

3. A pulse modulation photodetector which detects, by projecting pulsed light, presence or absence of a physical object based on whether the pulsed light is received or not according to passage of the physical object, the pulsed light having a pulse width modulated according to a light emission pulse which is generated based on a clock pulse signal and which has a modulation cycle, the modulation cycle, including:

a light emission period during which the light emission pulse is present; and a non light emission period other than the light emission period, the clock pulse signal having a pulse width being shorter in the light emission period than in the non light emission period, the modulation cycle further comprising:

an oscillator circuit for generating the clock pulse signal; and a light emission pulse generating circuit for generating the light emission pulse, based on the clock pulse signal thus generated by said oscillator circuit, said light emission pulse generating circuit, including:

an n-stage binary counter (n is an integral number of 2 or greater) for generating a frequency dividing pulse signal by dividing frequencies of the clock pulse signal; and a timing circuit for generating the light emission pulse, based on the frequency dividing pulse signal generated by the n-stage binary counter, said oscillator circuit changing the pulse width of the clock pulse signal, based on the frequency dividing pulse signal generated by the n-stage binary counter.

4. The pulse modulation photodetector according to claim 3, wherein said oscillator circuit changes the pulse width, based on a frequency dividing pulse signal outputted from an nth flip flop of the n-stage binary counter.

5. The pulse modulation photodetector according to claim 3, further comprising:

a light receiving element for receiving the pulsed light reflected by the physical object, so as to generate a receiving light pulse; and a signal processing circuit for counting a signal derived from the light receiving pulse generated by the light receiving element, so as to detect presence or absence of the physical object, said oscillator circuit changing the pulse width of the clock pulse signal according to a result of counting performed by the signal processing circuit.

6. The pulse modulation photodetector according to claim 1, wherein the light emission pulse is generated more than one time in 1 modulation cycle.

7. An electronic device, comprising a pulse modulation photodetector according to claim 1.

* * * * *